United States Patent [19]

Botbol et al.

[11] Patent Number: 4,589,132
[45] Date of Patent: May 13, 1986

[54] EMERGENCY SYNTHESIZED VOICE GENERATOR METHOD AND APPARATUS

[76] Inventors: Joseph M. Botbol, 9 Inkberry La.; Gerald I. Evenden, 56 Pebble La., both of North Falmouth, Mass. 02556

[21] Appl. No.: 417,509

[22] Filed: Sep. 13, 1982

[51] Int. Cl.⁴ ............................................. G10L 1/00
[52] U.S. Cl. ......................................................... 381/51
[58] Field of Search .................................... 381/51–53; 364/513.5; 340/825.36; 455/79

[56] References Cited

U.S. PATENT DOCUMENTS

| | | | |
|---|---|---|---|
| 3,169,221 | 2/1965 | Franchi | 455/79 |
| 3,803,358 | 4/1974 | Schirf et al. | 179/1 SA |
| 3,908,085 | 9/1975 | Gagnon | 179/1 SG |
| 4,040,013 | 8/1977 | Carlson | 340/825.36 |
| 4,197,497 | 4/1980 | Phelps | 455/18 |
| 4,232,391 | 11/1980 | Zanutti | 455/96 |
| 4,310,825 | 1/1982 | Tsunoda et al. | 340/52 |
| 4,459,474 | 7/1984 | Walton | 340/825.36 |

OTHER PUBLICATIONS

Master Specialties Company, "Give Your Equipment a Voice", MSC, Costa Mesa, Calif., 1974.

Primary Examiner—E. S. Matt Kemeny
Attorney, Agent, or Firm—John E. Reilly

[57] ABSTRACT

A method and apparatus for use in combination with a communications system, such as, a two-way radio which will simulate human voice at the level of a common microphone has been devised wherein the host radio has a transmit and receive mode for the transmission and reception of voice messages. The system has a memory device with at least one pre-encoded message permanently stored therein and a voice generator operative to convert the pre-encoded message into electrical analog voice signals which simulate the human voice. The device is programmable to extract one message from the memory and repetitively transmit the message at spaced time intervals to the voice generator. A relay control interconnects the voice generator and host radio for broadcasting the voice signals from the voice generator and is also capable of automatically converting the host radio to the receive mode for the reception of messages from an external source during the spaced time intervals between the transmission of the voice signals.

10 Claims, 4 Drawing Figures

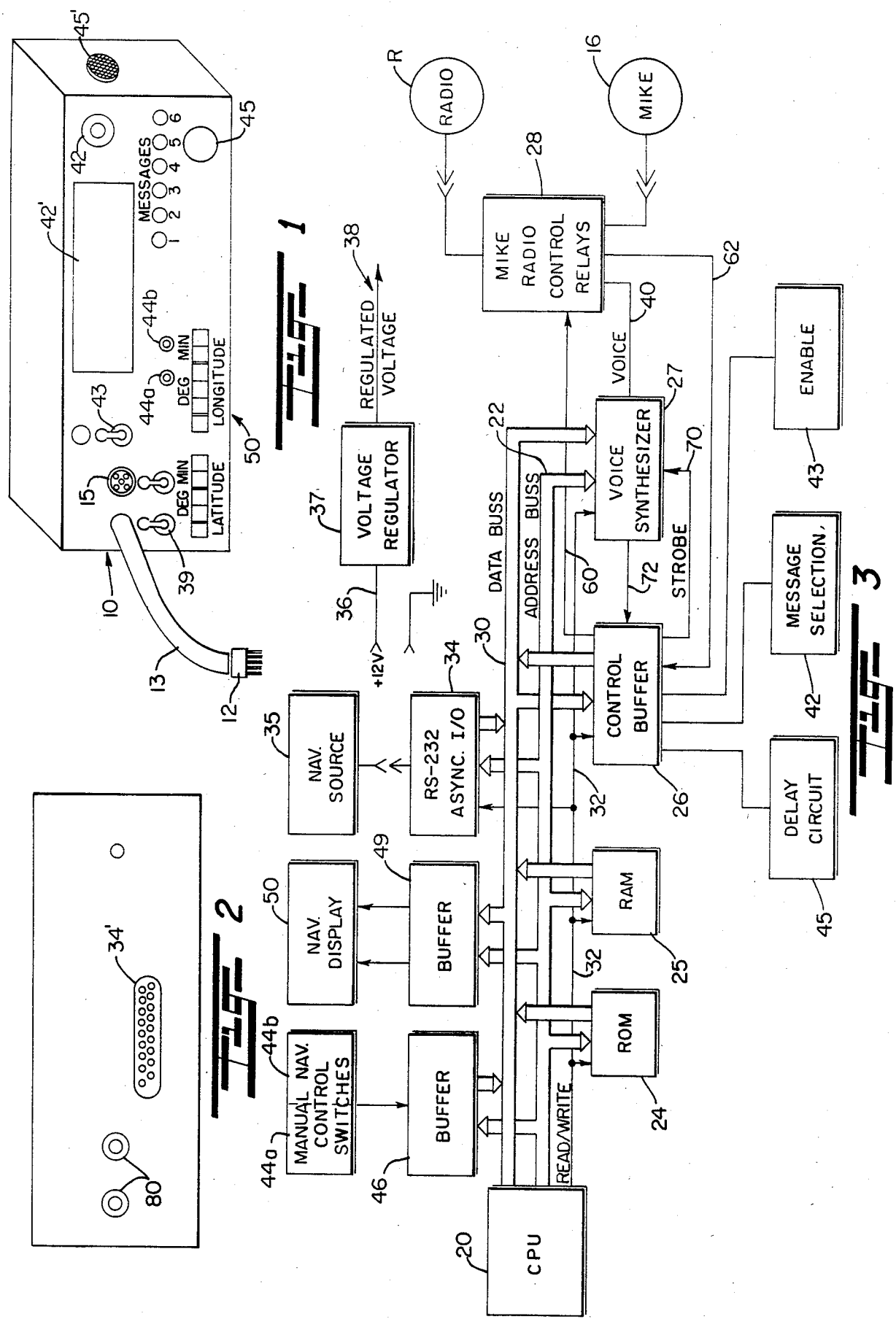

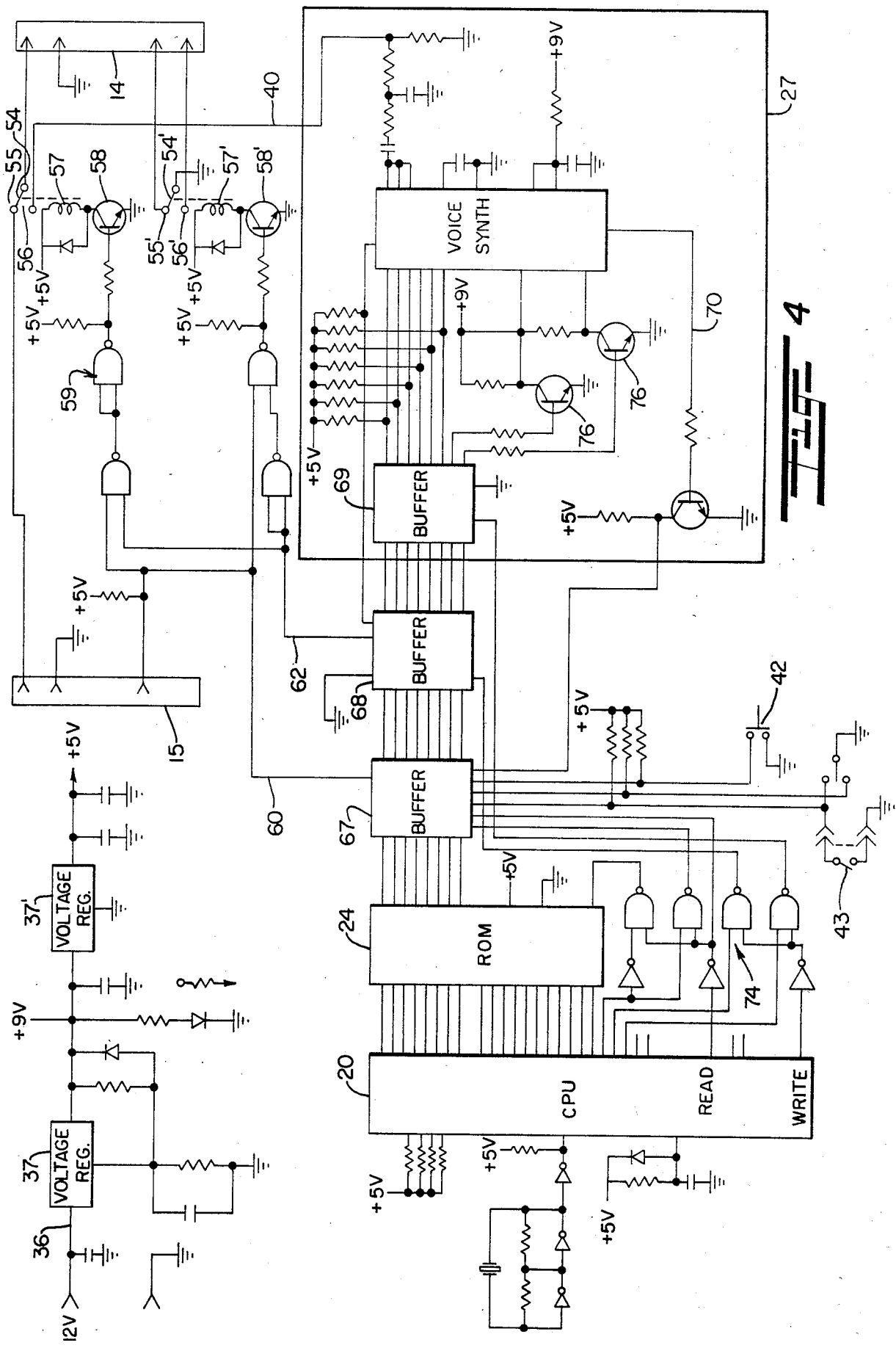

EMERGENCY SYNTHESIZED VOICE GENERATOR METHOD AND APPARATUS

This invention relates to voice emergency signal generators; and more particularly relates to a novel and improved method and apparatus for automated generation and transmission of pre-encoded emergency messages without interrupting normal transmission and receiving of message or signals in two-way radio devices or similar host communication devices.

BACKGROUND AND FIELD OF INVENTION

Two-way radios designed to permit emergency transmission of messages or signals find numerous applications or uses, such as for instance, for taxicabs or police vehicles in reporting a crime or accident, transmission of signals from downed aircraft or in boating, camping or hunting to report a malfunction, accident or injury. In the above and other applications, it is desirable to enable reliable automated or hands-off emergency synthesized voice signal generation so that the user or operator may attend personally to an emergency situation while the radio continues to transmit and receive messages. Efforts have been made in the past to provide some suitable form of pre-recorded message which can be selectively activated to continuously transmit messages. For example, U.S. Pat. No. 4,197,497 to S. W. Phelps broadcasts emergency messages on tape via a two-way radio. U.S. Pat. Nos. 3,908,085 to R. T. Gagnon and 3,803,358 to V. Schirf et al disclose voice synthesizers which employ a memory device for the storage of digital messages which can be converted to analog voice signals. In each case, however, the system is neither designed nor intended for emergency use. Other approaches have been taken in the direction of providing a signal which will permit location of a vessel which is in an emergency situation, such as, U.S. Pat. No. 4,232,391 to H. A. Zanutti. To the best of our knowledge, however, no one has successfully devised a system for generating emergency signals or messages over a two-way host communication system in such a way that one or more messages can be selectively broadcast at spaced intervals automatically without intervention or assistance of an operator and moreover in such a way that the messages are automatically separated by time intervals during which the transmitter is capable of receiving messages. In this same relation, it is desirable to provide such a system which is versatile so as to be capable of broadcasting virtually any type of emergency message, whether or not pre-encoded including navigational signals to provide an accurate position fix while leaving the operator free to tend to the emergency.

SUMMARY OF THE INVENTION

It is therefore an object of the present invention to provide for a novel and improved method and apparatus for transmission of emergency messages.

It is another object of the present invention to provide for a novel and improved method of selectively transmitting one or more emergency messages via a two-way radio which will permit transmission of the selected messages automatically and separated by spaced time intervals during which the host radio is automatically placed in a "receive" mode.

A further object of the present invention is to provide for a novel and improved automatic, digitally synthesized voice emergency signal generator which is conformable for use in emergency situations where it is desirable to permit the operator to leave the radio unattended while continuously transmitting and receiving messages, such as, taxicabs, emergency and police vehicles, aircraft and boats.

Another object of the present invention is to provide in association with a two-way radio for emergency synthesized voice signal generation which will automatically supply user identification, position fixes where necessary or desirable and otherwise describe the nature of the emergency through the selection of one of several pre-encoded messages.

Another object of the present invention is to provide in association with a host radio transmitter or host audio amplification system for the automatic voice reporting of violations of the security in buildings, yards and other protected areas by the engagement of the device through sensors located at critical positions throughout the protected areas and by transmitting pre-encoded messages appropriate to each sensor.

In accordance with the present invention, there has been devised a novel and improved method and apparatus for use in combination with a two-way radio which will simulate human voice at the level of a common microphone. The preferred form of invention resides in a communications system in which a host communication device, such as, a two-way radio has a transmit and receive mode for the transmission and reception, respectively, of voice messages. In the communications system of the present invention, a memory device has permanently stored therein at least one pre-encoded message, and voice generator means is operative to convert the pre-encoded message into electrical analog voice signals which simulate the human voice. Programmable means is operative to extract one of the messages from the memory device and repetitively transmit the message extracted at spaced time intervals to said voice generator means. Further, relay control means interconnects the voice generator means and the host communication device, the relay control means being responsive to transmission of the message by said programmable means to said voice generator means to place the communication device in the transmit mode for broadcasting said voice signals from the voice generator. The relay control is further characterized by being able to automatically convert the communication device to the receive mode for the reception of messages from an external source during the spaced time intervals between the transmission of voice signals; and in addition, when a manually operable microphone is connected to the relay control means, it will when activated override the transmission of voice signals from the voice generator in order to transmit normal human voice messages through the host communication device as well as to automatically convert the host communication device to the receive mode for reception of messages from an external source after the transmission of each voice message.

Most desirably, the memory device is a read only memory which is capable of storing several different pre-encoded messages and which can be selected by the operator or user by a select button or switch provided on a console that houses the communications system. Other messages may be encoded, including user identification, navigational messages or a special time delay or "dead man" circuit so that the device is extremely versatile and readily conformable for use in innumerable emergency situations.

The above and other objects, advantages and features of the present invention will become more readily understood and appreciated from a consideration of the following detailed description of a preferred embodiment when taken together with the accompanying drawings in which:

BRIEF DESCRIPTION OF THE DRAWINGS

FIG. 1 is a somewhat perspective view of the preferred form of apparatus in accordance with the present invention including the exterior display panel and plug-in connection for use in association with a two-way radio;

FIG. 2 is a rear view in elevation of the back panel of the apparatus;

FIG. 3 is a block diagram of the message generator and its control circuitry in accordance with the present invention; and FIG. 4 is schematic diagram illustrating in more detail the switching circuit between the microphone and radio control in accordance with the present invention.

DETAILED DESCRIPTION OF THE PREFERRED EMBODIMENT

Referring in detail to the drawings, there is illustrated in FIGS. 1 to 4 a preferred form of message generator 10 which by way of illustrative example is adapted for connection to a host communication system, such as, a two-way radio R by means of a microphone plug 12 connected to the radio and from which extends a lead or power cord 13 into the generator 10 for connection into a standard radio microphone jack as designated at 14 in FIG. 4. In addition, the generator 10 includes a jack 15 to permit connection of a hand-operated microphone 16 so that in a manner to be described, the microphone 16 is capable of automatically overriding the synthesized message portion of each cycle when activated for the conventional delivery of human voice messages.

The basic features of the generator 10 of the present invention may be better understood and appreciated from a consideration of the flow diagram of FIG. 3 wherein a microprocessor in the form of a CPU 20 has an address buss represented at 22 connected to a read only memory circuit 24, random access memory 25, and mike/radio control relay circuit 28, the relay circuit 28 being interposed between the two-way radio jack represented at 14 and the jack 15 for microphone 16. A data buss represented at 30 is connected between the CPU 20 and the memory circuits 24 and 25, control buffer 26, voice synthesizer 27 and relay control circuit 28. Similarly, a read/write line 32 is connected in parallel to the same circuitry. It should be noted further that the address buss 22, data buss 30 and read/write line 32 are connected to a digital input jack 34 for remote digital geographic coordinate input circuit 35. A standard 12-volt power supply is represented at 36 which, through a voltage regulator 37, converts the power to a voltage level compatible with the system, such as, for example, the regulated DC voltage source as represented at 38. Activation of the power supply is controlled by an on/off switch 39 as illustrated on the display panel of FIG. 1.

In a conventional manner, a plurality of messages to be broadcast are digitally encoded and permanently stored in the read only memory circuit 24. The CPU 20 is programmed to extract a selected digital message from the read only memory 24 and direct it to the voice synthesizer 27, the latter in turn converting the digital message to electrical analog voice signals which are applied over output line 40 through the relay control circuit 28 where they are fed directly into the microphone jack 14 for delivery to and broadcast by the host radio R. In order to select one of the encoded messages stored in the memory 24, a message switch 42 and enable switch 43 are provided on the display panel. The switch 42 is a pushbutton switch which can be manually depressed to select one of a plurality of numbered positions, each numerical position representing one of the pre-encoded messages. When the switch 42 is depressed to the desired message number on a display 42' on the display panel, the enable switch 43 is advanced to an "enable" position so as to initiate the emergency transmission cycle. In each cycle, the pre-encoded message is transmitted and broadcast as described followed by a pause interval to permit reception of a message or signal by the host radio R. The emergency transmission cycle will then continue to repeat itself unless or until it is deactivated by turning the switch 39 to the off position or returning the enable switch to a neutral position. Most desirably, the pre-encoded messages are incorporated into the memory in the manufacture of the generator, and one or more of the messages may contain suitable user identification. In other words, the user's entire message including identification is digitally encoded into the total message which is then transformed into a synthesized human voice via the voice synthesizer 27 and applied through the relay circuit 28 as described.

In addition to the pre-encoded messages stored in the memory 24, other messages and more information can be transmitted and broadcast under the control of the microprocessor 20. For instance, as shown in FIGS. 1 and 3, longitude and latitude selection switches 44a and 44b are connected through input buffer 46 to the data buss 30. The switches 44a and 44b preferably are thumbwheel type switches which will permit the operator to manually enter a navigational position fix which is then stored in the buffer 46 until addressed by the microprocessor 20 via the address buss 22 as illustrated. The numerical information stored is digitally encoded and transmitted during each cycle over the data buss for broadcast as a part of each message. Simultaneously, the information is directed through display buffer 49 and is simultaneously displayed on the display panel by means of a suitable LCD display 50. Alternately, commercially available navigation systems providing digital coordinate inputs can be connected to the generator 10, such as, via a navigational source 35 and digital input jack 34 secured as at 34' to the rear panel shown in FIG. 2. The input jack 34 will override the switches 44a and 44b to display navigational coordinates received from the source 35 on the display 50.

Another optional feature of the present invention resides in the use of a timer delay switch 45, which may also be termed a "dead man's" switch to cause deactivation of the generator 10 for a predetermined time interval until the enable switch 43 is depressed to reinitiate the transmission cycle. Specifically, if the operator desires to leave the generator 10 unattended for any length of time followed by reactivation of the transmission cycle, the switch 45 is depressed so as to interrupt the transmission and broadcast of messages. At the end of the predetermined time interval, an audible signal as represented at 45' on the display panel will sound to remind the operator to continue the disengagement or interruption interval. However, if the operator is unable to reset the disengagement interval by depressing the switch 45, the device will automatically initiate the emergency transmission cycles and continue to broadcast messages. In this way, one receiving the broadcast messages will be aware that the operator was unable to return to the generator and could be seriously injured or incapacitated.

An important feature of the present invention resides in the mike/radio control relay circuit 28. As shown in more detail in FIG. 4, upper and lower relay arms 54, 54' are movable between contacts 55, 55' and 56, 56', respectively, under the control of relay coils 57, 57' and amplifier transistors 58, 58'. When contact is made between the upper arm 54 and upper contact 55, a circuit is established between the hand mike 16 and radio mike jack 14 so as to bypass the voice generator 10. This will occur whenever the mike control button on the mike 16 is depressed so as to permit the user to speak directly through the mike and transmit a message in the usual manner through the radio. However, the voice generator is enabled whenever the mike button is released whereupon the relay arm 54 is advanced by the activated relay coil to make contact with the contact 56 and establish a circuit connection with the voice line 40 from the voice synthesizer circuit 27. As long as the mike button is depressed, the message transmitted through it will override the voice signals from the voice synthesizer circuit, since of course the relay connection at 56 is broken. However, as soon as the mike jack button is released, the relay coil 57 is energized, which condition is sensed by the CPU 20 via the mike sensing line 60 and voice signal sensing line 62 and initially will establish a predetermined pause or time delay before any other message can be directed through the voice synthesizer circuit 27. This will assure that any reply messages can be received by the radio during the pause interval. The lower relay coil 57' remains activated when the mike button is depressed as well as when the voice generator 10 is in use to switch the radio to the transmit mode. In this manner, the message generator 10 can remain activated or enabled when the hand mike is not in use, but will be overridden by the hand mike 16 so long as the mike button is depressed for the purpose of sending a message. Once released, the voice generator 10 will initiate the pause cycle and then resume sending messages; and, during each pause, the radio will revert to its receive mode in a conventional manner.

FIG. 3 is intended more to illustrate the interrelationship between the major components of the system in transmitting and receiving messages via a host communications system which preferably is a two-way radio as described. In the circuit shown in FIG. 4, like parts to those of FIG. 3 are correspondingly enumerated but in general are illustrated in more detail. Thus, for example, the control buffer 26 is comprised of two eight-bit input latch/buffer circuits as enumerated at 67 and 68, and the voice synthesizer circuit is comprised of an eight-bit output latch/buffer circuit 69 interfaced with the voice synthesizer chip designated at 27. The random access memory 25, together with the navigational position input switches 44 and "dead man" circuit 45, referred to as optional parts of the circuit, are omitted from the more detailed schematic illustration of FIG. 4 for the purpose of clarity. The power supply 36 is directed through two voltage regulators 37 and 37' connected in series so as to make available to different circuits of the system two different power levels, one for example being a 5-volt power source and the other being a 9-volt power source when operated off of the 12-volt DC battery.

The message select switch 42 will enable the operator to select one of a series of preencoded messages in the memory 24 and, when the external enable switch 43 is advanced to "enable", the system is activated to transmit the message selected. The messages are stored in a fixed order in the memory buffer with codes so as to be sensed by the CPU 20, the spacing in time between messages being established by a loop in the program of the CPU 20. The CPU 20 is programmed to continuously address the memory 24 and to continuously monitor the states or level of the lines into the memory 24 as well as the voice synthesizer circuit 27 and control relay 28 to assure that the voice synthesizer is in a condition to receive the message selected in the memory 24 and to convert it for transmission through the control relay 28. The CPU 20 then will send the message from the memory 24 through the voice synthesizer circuit 27. These messages are pulsed as bits and are strobed with the aid of strobe line 70 from the buffer section 26 into the voice synthesizer 27. The CPU 20 will then remain in a "wait" state until the voice synthesizer 27 has transmitted the message and indicates through the sync or ready line 72 that it is ready to receive the next message.

As previously described, the transmit line 62 from the control buffer energizes the relay coil 57 to retain the relay arm in closed position against the contact 56 so that the messages are transmitted over the voice line 40 through the radio mike jack 14. However, whenever the button on the mike 16 is depressed it will disable the relay by operating through the gating circuit 59 to de-energize the relay whereupon the relay arm 54 will advance into contact with the contact 55 to permit messages to be sent directly by the mike 16 into the radio mike jack 14. The CPU 20 will continuously examine the state of the mike button 16 so that when the mike button is released the CPU 20 will establish a pause interval, such as, on the order of 20 seconds to 30 seconds and permit the radio to receive messages from an external source.

A gating circuit as represented at 74 interconnects read and write lines on the microprocessor and the latch/buffers 67 and 68 in the control buffer section 26 as well as the latch buffer 69 in the voice synthesizer in order to transmit control pulses to the memory 24 and buffers 26 and 27 indicating that the CPU 20 is transmitting either read or write information. Amplifier transistors 76 are interpositioned between the output latch buffer 69 and voice synthesizer chip only to make the power supply compatible with the power source. For the purpose of illustration and not limitation, the CPU 20 may be a Z80 chip and the read only memory 24 a 2716 circuit. Each of the latch buffers 67, 68 and 69 may be a 74LS374 chip and the voice synthesizer is a chip sold under the trademark SC-01 by National Screw Company of Troy, Mich. The buffer amplifiers 76 both in the relay control circuit, the sync line and in the output lines interconnecting the output latch buffer 69 with the voice synthesizer 27 may be 2N2222 transistors.

The circuit described and comprising the generator 10 is extremely versatile and permits incorporation of a variety of switch selectable user identification customized emergency messages from which the user can select any one message most appropriate to a given situation. Although reference is made to the use of a pushbutton switch 42 for selection of messages the same may be accomplished with the use of a rotary switch on the display panel. Thus a variety of single or multiple message devices may be made available for interconnection to the host communication device for maritime, vehicular or natural emergencies. All versions of the device can be activated either by an enable switch 43 on the front panel, or by a switch or other mechanism on the back panel, shown in FIG. 2, which can short circuit across two wires that are attached to screw post terminals as represented at 80. In general, therefore, the device enables reliable "hands off" emergency synthesized voice signal generation so as to enable the user to handle an emergency while the radio is both unattended and transmitting an emergency message. The pause part of the cycle allows incoming responses to the message to be heard over the radio or host receiver. Of principal importance, however, is the fact that the user is unencumbered with manual operation of the radio during an emergency.

Each message may include identification which is digitally encoded as a total message to identify the user, and the device may be locally or remotely engaged with power tapped from any suitable 12-volt DC source. Using a standard microphone plug, output from the device is fed directly into the microphone jack of a host radio; and, most importantly, the radio microphone is plugged directly into the generator so as to permit automatic override when engaged and direct throughput when disengaged as hereinbefore related. Here, an indicator light associated with the enable switch indicates when the device is engaged and may flicker to indicate that the voices are being transmitted.

Without limiting the generality of the foregoing, typical applications of the system are for taxicabs in cases of assault or robbery, boating or maritime use in association with a standard radio provided on the vessel, police or other emergency vehicles, reporting of downed aircraft or emergency situations in camping or hunting, particularly if the user is disabled. Use of the optional "dead man" switch 45 would, for example, permit police officers to investigate an accident or crime and automatically issue a call for help if they do not return to re-initiate the disengagement interval.

It is therefore to be understood that various modifications and changes may be made in the preferred form of method and apparatus of the present invention without departing from the spirit and scope thereof as defined by the appended claims.

We claim:

1. In an emergency message generator system wherein a host two-way radio communication device has a transmit and receive mode for the transmission and reception, respectively, of voice messages, the improvement comprising:
   a memory device having at least one pre-encoded message permanently stored therein;
   voice generator means for converting each pre-encoded message into electrical analog voice signals whereby to simulate the human voice at the audible signal level of a microphone;
   means for extracting each said message from said memory and repetitively transmitting said message extracted at spaced time intervals to said voice generator means; and
   relay control circuit means interconnecting said voice generator means and said host communication device being responsive to transmission of said message by said extracting means to said voice generator means to place said communication device in the transmit mode for broadcasting of said voice signals from said voice generator means, said relay control circuit means including control means operative to automatically convert said host communication device to the "receive" mode for the reception of messages from an external source during the spaced time intervals between the transmission of said voice signals, whereby messages are transmitted and received automatically while said communication device remains unattended, and a manually operable microphone to override the transmission of voice signals from said voice generator means for the transmission of human voice messages and to automatically convert said communication device to the receive mode for reception of messages from an external source after the transmission of each human voice message.

2. In a system according to claim 1, including message select means associated with the memory device for selecting one of a plurality of messages stored therein for extraction by said extracting means.

3. In a system according to claim 1, said memory device being a read only memory circuit.

4. In a system according to claim 3, including control buffer means interposed between said read only memory circuit and said voice generator means.

5. In a system according to claim 4, said control buffer means defined by a pair of latch buffer circuits and said message select means associated with said one of said latch buffer circuits.

6. In a system according to claim 2, said message select means being characterized by being manually selectable to select one of a plurality of messages stored in said memory device.

7. An emergency synthesized voice generator apparatus, comprising in combination:
   a host communication device having a transmit and receive mode for the transmission and reception, respectively, of voice messages;
   a memory device having a plurality of encoded message permanently stored therein;
   voice generator means including a voice synthesizer circuit for converting said encoded messages into electrical analog voice signals whereby to simulate the human voice at the audible signal level of a microphone;
   means for selecting one of said messages from said memory and repetitively transmitting each said message selected at spaced time intervals for conversion by said voice generator means into said voice signals; and
   relay control means interconnecting said voice generator means and said host communication device responsive to activation of said voice generator means to place said communication device in the transmit mode for broadcasting of said voice signals from said voice generator means, said control circuit means operative to automatically convert said communication device to the "receive" mode for the reception of messages from an external source during the spaced time intervals between the transmission of said voice signals, and a manually operable microphone circuit to override the transmission of voice signals from said voice generator means for the transmission of human voice massages, and time delay means associated with said voice generator means to delay the transmission of messages by said selectable means for a predetermined time interval after said voice generator has been activated.

8. The method of transmitting emergency voice messages in which a voice generator is connected to a two-way radio having a microphone, said radio capable of radio transmission and receipt of voice messages, the steps comprising:

storing pre-encoded messages in said voice generator;

selecting one of said pre-encoded messages and converting same into electrical analog signals which simulate the human voice;

delivering a series of said pre-encoded messages selected at spaced time intervals to said two-way radio communication system for transmission by said system;

enabling said two-way radio communication system to receive messages from an external source during each time interval between the transmission of said pre-encoded messages, whereby messages are transmitted and received automatically while said radio remains unattended; and overriding the transmission of voice signals from said voice generator for the transmission of human voice messages over said microphone and converting said radio to the receive mode for reception of messages from an external source after the transmission of each human voice message.

9. The method according to claim 8 further characterized by the step of preempting the transmission of pre-encoded messages by the transmission of normal human voice messages at the host communication system.

10. The method according to claim 8 further characterized by entering user identification information into at least one of said pre-encoded messages.

* * * * *